United States Patent

[11] 3,626,813

[72] Inventor Kenneth G. Kreuter
 Goshen, Ind.
[21] Appl. No. 57,656
[22] Filed July 23, 1970
[45] Patented Dec. 14, 1971
[73] Assignee Robertshaw Controls Company
 Richmond, Va.

[54] DIFFERENTIAL PRESSURE CELL
 16 Claims, 2 Drawing Figs.
[52] U.S. Cl. .................................................. 92/97,
 73/393, 73/407
[51] Int. Cl. ............................................... F01b 19/00
[50] Field of Search .......................................... 92/97, 48,
 38; 73/407, 410, 393

[56] References Cited
UNITED STATES PATENTS

| | | | |
|---|---|---|---|
| 2,497,255 | 2/1950 | Brown .......................... | 73/407 X |
| 2,632,474 | 3/1953 | Jones............................ | 92/38 X |
| 2,985,194 | 5/1961 | Brown .......................... | 92/38 X |
| 3,050,085 | 8/1962 | Reese............................ | 92/38 X |
| 3,163,091 | 12/1964 | Grier............................ | 92/38 X |

*Primary Examiner*—Martin P. Schwadron
*Assistant Examiner*—Leslie J. Payne
*Attorney*—Anthony A. O'Brien

ABSTRACT: A differential pressure cell having a multiple-diaphragm structure which cooperates with a torsion assembly to convert pressure differentials into mechanical motion wherein the diaphragms are protected from exposure to high stress, from overtravel and from becoming locked in a high-limit position during extended periods of overpressure.

Patented Dec. 14, 1971

3,626,813

INVENTOR
KENNETH G. KREUTER

BY Anthony A. O'Brien
ATTORNEY

DIFFERENTIAL PRESSURE CELL

BACKGROUND OF THE INVENTION

1. Field of the Invention

The present invention pertains to differential pressure responsive devices and, more particularly, to a differential pressure cell for accurately and effectively converting pressure differentials into mechanical motion.

2. Description of the Prior Art

In numerous applications, it is often desired to accurately determine the pressure differential existing between two pressure sources. Such pressure sources may, for example, correspond to the pressures on either side of an orifice in a flow line or the pressures existing at various points in a turbine or compressor. Aside from the necessity of providing accurate output readings, an effective differential pressure device must also provide overpressure protection, temperature compensation and pressure fluctuation damping, must be constructed so as to prevent diaphragm lockup during extended periods of overpressure, must be easy to clean and inspect, and must not require critical matching or calibration of component parts.

While the prior art, as exemplified by U.S. Pat. Nos. 2,664,749 and 3,050,085, is generally cognizant of differential pressure devices which provide certain advantages, such patents do not provide all of the above-mentioned advantages as well as check valve overpressure protection, for example, and are therefore of limited utility in many applications. U.S. Pat. No. 2,664,749, for instance, includes a pair of bellows exposed on opposite sides to input pressure signals and enclosing a liquid therebetween. The two bellows are mechanically linked together and cooperate with a torque tube output assembly such that the enclosed liquid flows from one of the bellows to the other in response to pressure differentials to provide an output signal. The unit further includes a valving arrangement whereby communication between the bellows will be sealed off in response to excessive pressure differentials. U.S. Pat. No. 3,050,085 is generally similar except that the bellows are not mechanically linked and that the output assembly is not the torque type.

As typified by the two above-cited patents, the prior art is disadvantageous in that the bellows tend to become locked in their high-limit positions during extended periods of overpressure whenever ambient temperature drops cause contraction of liquid trapped within the bellows by the valving arrangement. Such conditions may be brought about by any number of causes resulting in unreliable operation of the differential pressure device itself as well as erratic system performance where such devices are used in conjunction with process control equipment, feedback systems, or the like.

A number of other conventional differential pressure devices, as exemplified by U.S. Pat. No. 2,770,258, employ diaphragm operators rather than bellows, the diaphragm being mechanically simpler in design and manufacture as well as being more economical. However, diaphragms are generally fragile, and backup members conforming to a high degree of accuracy with the shape of the diaphragms are generally required. Such arrangements have the disadvantage of being complex and tend to collect dirt and other foreign matter which directly affects the accuracy and life of the device.

SUMMARY OF THE INVENTION

It is, therefore, an object of the present invention to construct a differential pressure cell having diaphragm overpressure protection and wherein the diaphragms are precluded from locking during overpressure periods whenever ambient temperature drops are experienced.

It is another object of the present invention to construct a differential pressure cell having inherent temperature compensation as well as independently operable check valves for precluding diaphragm lockup during intervals of excessive pressure differentials.

It is a further object of the present invention to construct a differential pressure responsive device having pressure chambers which are easily accessible for cleaning.

The present invention has another object in that a torsion assembly cooperates with diaphragm sensors to provide output signals in response to sensed pressure differentials.

A further object of this invention is to construct a differential pressure cell having excessive pressure fluctuation damping.

The present invention is generally characterized in that a differential pressure cell includes a housing defining first and second input pressure chambers and a fluid passageway therebetween, first and second diaphragm assemblies in the housing, each being exposed to the pressure within a respective one of the input pressure chambers, the first and second diaphragm assemblies cooperating with the housing to define first and second recesses interconnected by the fluid passageway and adapted to contain a liquid, a torsion assembly operatively connected with the first diaphragm assembly and rotatable from a relaxed position in response to pressure differentials between the first and second input pressure chambers acting upon the first and second diaphragm assemblies, first and second valves in the housing connected to the first and second diaphragm assemblies, respectively, for actuation thereby in response to excessive pressure differentials between the first and second input pressure chambers to selectively seal a respective one of the first and second recesses whereby liquid trapped therein supports a corresponding one of the first and second diaphragm assemblies against damage, and first and second check valves in the housing for equalizing the pressures within the first and second recesses, respectively, and the fluid passageway whenever the fluid pressure within a respective one of the first and second recesses falls below that of the fluid passageway.

The present invention is advantageous over conventional differential pressure responsive devices in that no welding is required, the diaphragms are protected from overpressure and overtravel without the use of corrugated backup plates, input pressure chambers are easily accessible for cleaning without loosing the fluid charge between the diaphragms, temperature compensation is inherently provided, diaphragm lockup during periods of excessive pressure differentials is precluded, static unbalance is eliminated, the criticality of component tolerances is reduced, and excessive pressure fluctuations are automatically damped.

Further objects and advantages of the present invention will become apparent from the following description of the preferred embodiment when taken in conjunction with the accompanying drawing.

DESCRIPTION OF THE PREFERRED EMBODIMENT

Figures 1, 2:
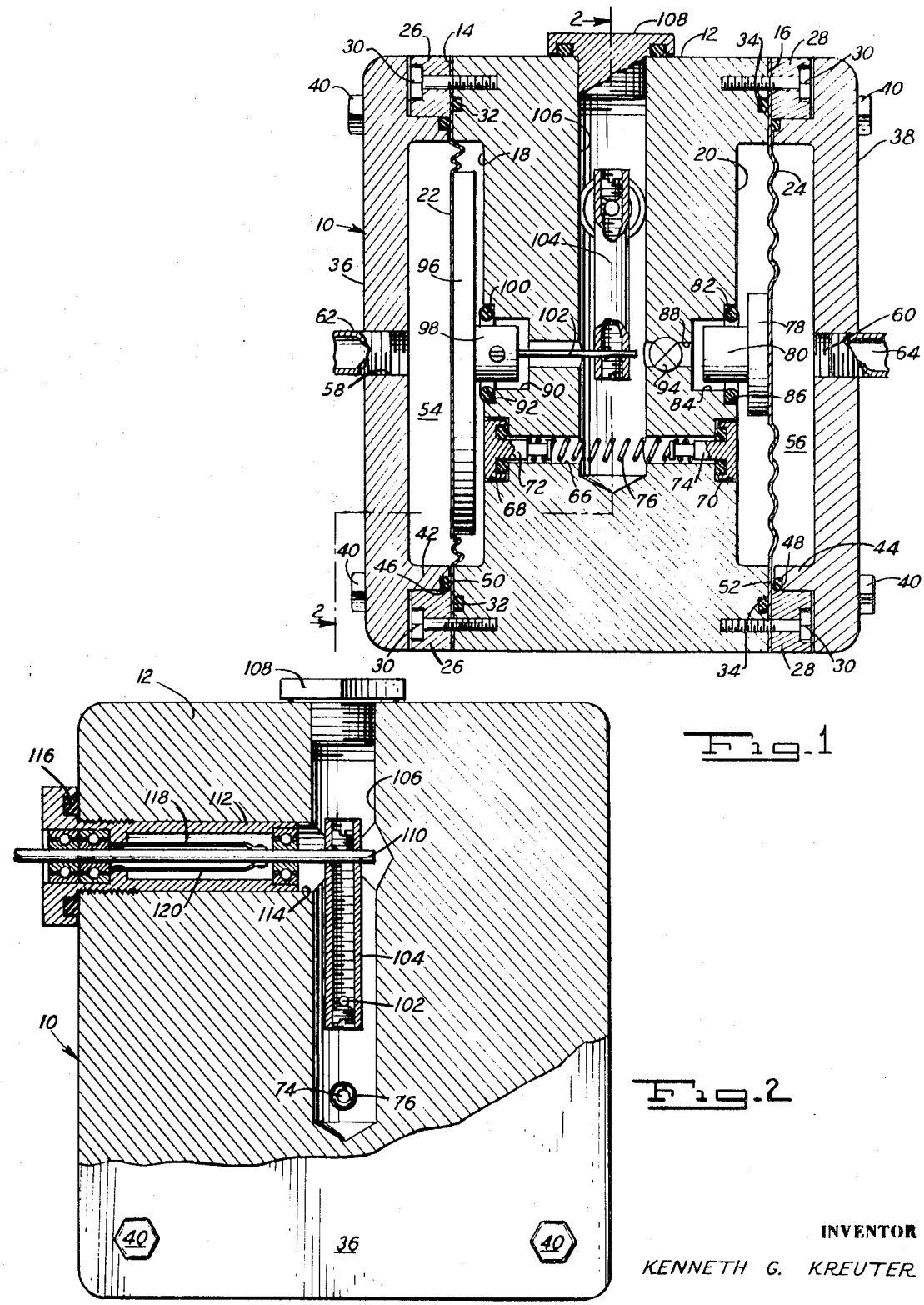
FIG. 1 is a sectional view of a differential pressure cell according to the present invention.
FIG. 2 is a sectional view of the differential pressure cell of FIG. 1 taken along line 2—2.

Referring to FIG. 1, the present invention is embodied in a differential pressure cell having a housing, indicated generally at 10, including a main body member 12 having a pair of outer sidewalls 14 and 16 which are each partially offset to define centrally aligned cylindrical recesses 18 and 20, respectively. Circular diaphragms 22 and 24, respectively, are disposed within cylindrical recesses 18 and 20 and are each mounted at their periphery between a respective one of sidewalls 14 and 16 of body member 12 and retainer plates 26 and 28, respectively. The retainer plates 26 and 28 are rigidly mounted to the housing 10 by any suitable means such as bolts 30 such that each of the diaphragms 22 and 24 is compressively sealed at its inner surface by one of a pair of O-rings 32 and 34 disposed within suitable annular recesses in body member 12.

A pair of cover plates 36 and 38 are attached to either side of body member 12 by any suitable means such as bolts 40 which pass through retainer plates 26 and 28 and into main body member 12. Each of the cover plates 36 and 38 has an inwardly directed annular protrusion 42-44 which cooperates at an offset edge 46–48 with a suitable O-ring seal 50–52 to define a pair of pressure chambers 54 and 56, respectively. Cover plates 36 and 38 further define suitably threaded input ports 58 and 60, respectively, extending centrally through the plates and connected with a respective pressure line 62 and 64 such that each of the pressure chambers 54 and 56 communicates with one of two pressure sources (not shown) of which the pressure differential is to be measured.

A first transverse passageway 66 within main body member 12 interconnects recesses 18 and 20 and contains counterbores 68 and 70, respectively, at each end. A pair of generally T-shaped check valves 72 and 74 are disposed within the ends of passageway 66 and are biased closed against the shoulders provided by counterbores 68 and 70 by a suitable tension spring 76 positioned within the passageway 66.

Diaphragm 24 is preferably constructed from a resilient metal and is concentrically corrugated as can be seen in FIG. 1. Attached to the center of diaphragm 24 is a flat, round plate 78 having a generally cylindrical protrusion 80 formed upon one of the flat sidewalls thereof. An D-ring seal 82 is positioned about cylinder 80 with the cylinder and the seal disposed within concentric counterbores 84 and 86, respectively, which are located in one end of the second transverse passageway 88 interconnecting recesses 18 and 20. A needle valve 94 is located within the passageway 88 adjacent counterbore 84, and the passageway is terminated at its other end by another pair of concentric counterbores 90 and 92.

Diaphragm 22 includes a flat, round plate 96 resiliently connected at its periphery to main body member 12 and having a generally cylindrical protrusion 98 formed upon an inner surface thereof at its center. An O-ring seal 100 is positioned about cylinder 98 with the cylinder and the seal disposed within counterbores 90 and 92, respectively, of passageway 88 as shown in FIG. 1.

A resilient rod 102 is fixedly attached at one end to cylinder 98 of diaphragm 22 and is connected at its other end to a linkage member 104 which is disposed within a main passageway 106 extending from the top of main body member 12 to a point just below transverse passageway 66 so as to bisect both passageway 66 and passageway 88. A sealing plug 108 is removably secured, as by threads, within the upper end of passageway 106 such that the interior of the housing forms a closed chamber.

Referring now to FIGS. 1 and 2, the upper end of linkage member 104 is connected to one end of a rod 110 which is connected at its other end to a suitable output device such as a force balance pneumatic or electric transducer (not shown). Rod 110 is supported by press-fit sealed bearings within a hollow sleeve 112 which is mounted as by threads within a transverse bore 114 extending outwardly from an upper portion of main passageway 106 within body member 12 perpendicular to the line of travel of diaphragms 22 and 24. The hollow sleeve 112 has an O-ring seal 116 and a pair of resilient, flexible torque rods 118 and 120 which are attached at one end to an annular interior shoulder of sleeve 112 and at their other end to rod 110.

In operation, the interior cavity formed by main passageway 106, transverse passageways 66 and 88 and recesses 18 and 20 is completely filled with a suitable incompressible liquid, such as oil, and the plug 108 is thereafter screwed tightly in place. With the differential pressure cell thus fully charged, suitable connections are made between the two pressure sources to be compared and input pressure chambers 54 and 56, respectively, via lines 62 and 64.

Since the interior cavity of the device is completely charged with an incompressible liquid, both diaphragms will move in unison; i.e., both diaphragms tend to move toward the pressure chamber having the lower pressure. Thus, as the pressure in chamber 54 decreases, the relatively larger pressure in chamber 56 will tend to move diaphragm 24 to the left (as visualized in FIG. 1) so as to cause some of the fluid within recess 20 to flow through transverse passageway 88 and into recess 18 resulting in a corresponding movement of diaphragm 22 to the left. Since diaphragm 22 is connected to linkage member 104 by resilient rod 102, the resultant movement of diaphragm 22 to the left causes the lower end of linkage member 104 to move similarly to the left such that transverse rod 110 is rotated clockwise against the torsional force produced by the action of torque rods 118 and 120. Since such force is proportional to the degree of rotation of rod 110 and is transmitted back to the diaphragms through linkage member 104 and rod 102, the diaphragms will continue to move until the pressure differential is balanced out by the action of torque rods 118 and 120. The degree of rotation of rod 110 is thus directly related to the degree of transverse movement of high-rate diaphragm 22 which is dependent upon the pressure differential between chambers 54 and 56. Therefore, the rotation of rod 110 is indicative of the pressure differential across the device and can be utilized to drive a suitable output device such as an indicator, a recorder, a controller, or the like.

It can be seen that due to the above-described construction and operation of the torsion assembly according to the present invention, the need for conventionally employed spring biasing and balancing assemblies which are typically disposed adjacent the diaphragms is completely eliminated such that diaphragm complexity is reduced as is the possibility of diaphragm damage by such springs during operation. Furthermore, the present construction removes all of the biasing, balancing and output mechanisms away from the general operative area of the diaphragms whereby interference with the free movement of the diaphragm is precluded.

If the pressure within chamber 56 is much larger than that within chamber 54, both diaphragms will tend to continue moving to the left as described above whereupon the plate 78 of diaphragm 24 will eventually contact O-ring 82 to effect a compression seal between plate 78 and the shoulder of counterbore 86 such that communication between recesses 18 and 20 is stopped and fluid within recess 20 is blocked from further egress. In this manner, recess 20 becomes sealed such that the fluid trapped therein prevents the relatively high pressure within chamber 56 from distorting, deforming or otherwise damaging the diaphragm 24. Thus, diaphragm movement is automatically limited under conditions of high differential pressures, and exposure of the diaphragm to excessive stresses is prevented so that diaphragm 24 can be made extremely thin without having to resort to the addition of overpressure support means such as a corrugated backup plate within recess 20.

As can be seen in FIG. 1, similar operation will result if the larger pressure is applied to chamber 54. That is, when the pressure within chamber 54 is greater than that within chamber 56, diaphragm 22 will tend to move to the right (as visualized in FIG. 1) causing some of the fluid within recess 18 to flow through transverse passageway 88 into recess 20 whereupon diaphragm 24 will move a corresponding distance to the right. As before, the movement of diaphragm 22 will produce a corresponding movement of the lower end of linkage member 104 such that rod 110 will be rotated counterclockwise against the torsional force produced by torque rods 118 and 120.

If the pressure within chamber 54 greatly exceeds that within chamber 56, diaphragm 22 will continue moving to the right until plate 96 contacts O-ring 100 to effect a compressive seal between plate 96 and the shoulder of counterbore 92. In this manner, the remaining fluid within recess 18 is entrapped therein so as to prevent the relatively high pressure within chamber 54 from deforming or otherwise damaging the diaphragm.

Thus, rod 110 will be rotated clockwise or counterclockwise from its normal or balanced position by an amount proportional to the pressure differential existing between input chambers 54 and 56. In addition, both diaphragms are provided with automatically operating fluid seals or valves such that upon the occurrence of high-pressure differentials, fluid will be trapped behind that diaphragm which is exposed to the high-pressure input so as to evenly support the entire surface of the diaphragm thereby preventing distortion or deformation thereof. Consequently, upon the resumption of normal operation with the pressure differentials within acceptable tolerance limits, accurate output signals will be produced without necessitating recalibration or other adjustments.

During extended periods of overpressure, the diaphragm which is exposed to the higher pressure input will be maintained in its high-limit position with its recess sealed as described above. If, at this time, a drop in ambient temperature is experienced, the fluid trapped within the sealed recess will contract somewhat. In order to prevent the diaphragm from being locked in its high-limit position under these circumstances, check valves 72 and 74 are disposed within transverse passageway 66 to permit pressure equalization between main passageway 106 and recesses 18 and 20, respectively, whenever the pressure in either of the recesses drops below that within the main passageway. In other words, during intervals of overpressure, and subsequent ambient temperature drop, the pressure within the sealed recess will tend to drop below that within the main passageway. This pressure drop acts upon the check valve for the sealed recess in a direction causing movement thereof away from its seat such that communication is reestablished between the recess and the main passageway until the pressures therein become equalized. It is noted that if the pressure in the sealed recess exceeds that within the main passageway, the check valve will remain closed such that the fluid within the recess remains entrapped therein to protect the diaphragm. In this manner, diaphragm protection is provided while, at the same time, overtravel lockup thereof is efficiently and effectively precluded.

As stated above, since the internal cavity of the differential pressure cell is fully charged with fluid, both diaphragms 22 and 24 move in unison without having to be mechanically linked. In addition, since the diaphragms are provided with automatic overtravel and overstress protection, they can be made extremely thin without being subject to damage during intervals of high-pressure differentials. As a result, diaphragm 22 is preferably constructed to have a high spring rate with the torsion assembly connected to it while diaphragm 24 is preferably constructed to have a very low spring rate. In this manner, expansion and contraction of the fluid charge between the two diaphragms tends to move only the low-rate diaphragm 24 with negligible effect on the position of the high-rate diaphragm 22. Thus, the output signal from rod 110 is relatively unaffected by ambient temperature fluctuations so as to provide effective temperature compensation. In addition, since the entire interior cavity of the housing is filled with fluid, both diaphragms are in communication with each other such that the pressure on their interior surfaces is equalized. Consequently, the relative areas of the diaphragms are not critical and no matching is required.

During normal operation of the differential pressure cell, if the frequency of input pressure signal fluctuations becomes excessive, needle valve 94 which is disposed adjacent the low-rate diaphragm 24 within passageway 88 provides sufficient damping such that output signal variations remain within suitable tolerance limits.

It is additionally noted that both diaphragms 22 and 24 are sealed by plates 26 and 28 and O-rings 32 and 34, respectively, against the sidewalls of main body member 12 such that cover plates 36 and 38 may be removed to provide access to chambers 54 and 56 without loosing the internal fluid charge. This construction permits easy cleaning of input chambers 54 and 56 as well as a simple means of inspecting the diaphragms for wear, defects, or the like.

It is also important to note that the volume of the fluid charge between the diaphragms is not critical and that various different pressure ranges can be measured by the present invention by merely employing different diaphragms having various deflection force movement characteristics.

Thus, a differential pressure cell constructed in accordance with the present invention provides numerous advantages over conventional devices of this general type such as simplicity of design and manufacture, diaphragm stress and overtravel protection, convenient access to the input chambers without loosing the fluid charge, ambient temperature compensation, diaphragm lockup prevention during extended overpressure intervals, pressure fluctuation damping, the elimination of static unbalance, and the elimination of a need for corrugated backup devices to protect the diaphragms.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. In a differential pressure cell, the combination comprising
   a housing defining first and second input pressure chambers and a fluid passageway therebetween,
   first and second diaphragm means in said housing, each being exposed to the pressure within a respective one of said pair of input pressure chambers,
   said first and second diaphragm means cooperating with said housing to define first and second recesses interconnected by said fluid passageway and adapted to contain a liquid,
   torsion means operatively connected with said first diaphragm means and rotatable from a relaxed position in response to pressure differentials between said first and second input pressure chambers acting upon said first and second diaphragm means,
   first and second valve means in said housing connected to said first and second diaphragm means, respectively, for actuation thereby in response to excessive pressure differentials between said first and second input pressure chambers to selectively seal a respective one of said first and second recesses whereby liquid trapped therein supports a corresponding one of said first and second diaphragm means against damage, and
   first and second check valve means in said housing equalizing the pressures within said first and second recesses, respectively, and said fluid passageway whenever the fluid pressure within a respective one of said first and second recesses falls below that of said fluid passageway.

2. The invention as recited in claim 1 wherein said first and second valve means are mounted in said housing between said first and second recesses, respectively, and said fluid passageway.

3. The invention as recited in claim 1 wherein said first and second check valve means are mounted in said housing between said first and second recesses, respectively, and said fluid passageway.

4. The invention as recited in claim 1 further including needle valve means mounted between said second valve means and said main fluid passageway.

5. The invention as recited in claim 1 wherein said first diaphragm means has a relatively high spring rate and said second diaphragm means has a relatively low spring rate.

6. The invention as recited in claim 5 wherein said second diaphragm means comprises a thin corrugated circular diaphragm whereby expansion and contraction of liquid contained within said internal cavity is compensated for by movement of said second diaphragm means.

7. The invention as recited in claim 1 wherein said fluid passageway includes a transverse passageway extending between said first and second recess and wherein said first and second valve means include first and second plates responsive to movement of said first and second diaphragm means, respectively, to selectively block communication between a respective one of said first and second recesses and said transverse passageway.

8. The invention as recited in claim 7 wherein said first and second valve means further include first and second O-rings disposed between a respective one of said first and second plates and a respective end of said transverse passageway.

9. The invention as recited in claim 8 wherein said transverse passageway includes first and second counterbores in the ends thereof, and wherein said first and second O-rings are disposed partially within said first and second counterbores, respectively.

10. The invention as recited in claim 1 wherein said fluid passageway includes an internal passageway extending between said first and second recesses, and wherein said first and second check valve means include first and second check valves each cooperating with a respective one of said ends of said internal passageway.

11. The invention as recited in claim 10 including a tension spring disposed within said internal passageway and interconnecting said first and second check valves.

12. The invention as recited in claim 11 wherein said internal passageway includes a pair of counterbores in the ends thereof, and wherein said first and second check valves are disposed partially within a respective one of said pair of counterbores.

13. The invention as recited in claim 1 wherein said torsion means includes a rod rotatably disposed within said housing and torque means connecting said rod with said housing whereby said torque means generates a force opposing rotation of said rod and proportional to the degree of rotation thereof from a relaxed position.

14. The invention as recited in claim 13 wherein said torque means further includes a linkage member fixedly connected at one end to said rod and at its other end to said first diaphragm means.

15. The invention as recited in claim 14 wherein said first and second diaphragm means are movable along a predetermined line lying in a first plane and the axis of said rod lies in a second plane and is perpendicular to said line of movement.

16. The invention as recited in claim 15 wherein said linkage member is disposed generally perpendicular to said first and second planes whereby movement of said first and second diaphragm means along said predetermined line of movement produces rotation of said rod.

* * * * *